United States Patent [19]
Purple et al.

[11] Patent Number: 5,745,115
[45] Date of Patent: Apr. 28, 1998

[54] GRAPHICAL USER INTERFACE HAVING A SHARED MENU BAR FOR OPENED APPLICATIONS

[75] Inventors: Lance Jeffery Purple; Leigh Allen Williamson, both of Austin, Tex.

[73] Assignee: International Business Machines Corporation, Armonk, N.Y.

[21] Appl. No.: 587,181

[22] Filed: Jan. 13, 1996

[51] Int. Cl.$^6$ .................................................. G06F 3/00
[52] U.S. Cl. ........................ 345/352; 345/340; 345/682
[58] Field of Search .............................. 395/326–358, 395/682; 345/326–358, 682

[56] References Cited

U.S. PATENT DOCUMENTS

| | | | |
|---|---|---|---|
| 4,815,029 | 3/1989 | Barker et al. | 395/352 X |
| 4,862,389 | 8/1989 | Takagi | 395/354 |
| 5,220,675 | 6/1993 | Padawer et al. | 395/352 |
| 5,241,625 | 8/1993 | Epard et al. | 395/163 |
| 5,261,042 | 11/1993 | Brandt | 395/156 |
| 5,287,447 | 2/1994 | Miller et al. | 395/352 |
| 5,339,392 | 8/1994 | Risberg et al. | 395/161 |
| 5,392,386 | 2/1995 | Chalas | 395/352 |
| 5,412,772 | 5/1995 | Monson | 395/155 |
| 5,530,796 | 6/1996 | Wang | 395/352 |
| 5,564,048 | 10/1996 | Eick et al. | 395/326 X |
| 5,596,702 | 1/1997 | Stucka | 395/340 |
| 5,600,778 | 2/1997 | Swanson et al. | 395/352 X |
| 5,625,783 | 4/1997 | Ezekiel et al. | 395/352 |
| 5,634,019 | 5/1997 | Koppolu et al. | 395/352 X |
| 5,644,739 | 7/1997 | Moursund | 395/354 |

Primary Examiner—John E. Breene
Attorney, Agent, or Firm—Richard A. Henkler; Andrew J. Dillon

[57] ABSTRACT

A computer system and method of operation are disclosed that simplifies the menu bar for use by a group of active applications. The computer system typically uses a bus coupled to a central processing unit and further coupled via the bus to a computer system memory. The computer system further includes an X Window menu manager and an X Window menu bar, both of which are located within the computer system memory during operation. The X Window menu manager includes a shared menu library. The X Window menu manager implements simultaneously instantiation of a set of menu widgets from the shared menu library that are associated with a computer program selected from the several active computer programs when the program focus is shifted to one of the active programs. The X Window menu bar, which is controlled by the X Window menu manager and displayable by the computer system, is shared by the plurality of active programs so that only the computer program receiving the application focus has its associated set of menu widgets displayed after the focus shift. The method for providing the shared menu bar is accomplished as follows. Initially, the system establishes a part editor for each active application. Next, the system passes the focus to one of the active applications and then retrieves a copy of a base menu bar from a window state object in the X Window environment. Afterwards, the system selects the appropriate widgets for display on the computer system. Next, the base menu bar is displayed and then the part editor is notified of the selected widgets to be displayed in the shared menu bar. Lastly, the system displays the selected widgets in the base menu bar or X Window menu bar.

21 Claims, 5 Drawing Sheets

GRAPHICAL USER INTERFACE HAVING A SHARED MENU BAR FOR OPENED APPLICATIONS

BACKGROUND OF THE INVENTION

CROSS-REFERENCE TO RELATED APPLICATIONS

The present application contains subject matters related to co-pending application Ser. No. 08/587,182, entitled METHOD AND SYSTEM FOR MERGING MULTIPLE WINDOWS EVENT DISTRIBUTION, filed on even date herewith and assigned to the assignee hereof and incorporated by reference herein.

1. Technical Field

The present invention relates in general to a data processing system having a graphical user interface and, more specifically, to a data processing system with GUI where multiple software objects share a common menu.

2. Description of the Related Art

Computer systems using graphical user interfaces are well-known in the art. Within a typical graphical user interface, more than one application can be opened with the focus to a particular application being shifted from one to another as desired by the user. Each time an application is opened, the typical application has its own menu bar above the window. Some operating systems have attempted to standardize menu items across applications. One such operating system is the Macintosh operating system developed by Apple Computers. Further, OpenDoc is a software system originally implemented on the Macintosh operating system. The MacOS includes a menu manager component that allows applications to create private menu bars, populate the menu bars with menus, and then display the menu bars in a shared location, typically outside the application window at the top of the screen. When the user switches from one application to another, the shared menu bar automatically displays the new applications menus.

OpenDoc is being implemented across various platforms of operating systems, such as, for example, the Unix-based operating system developed by IBM Corporation known as AIX, which uses the X-Windows graphics system. Within the cross-platform Unix-based system is a GUI toolkit known as Motif. The Motif toolkit does not provide a menu manager or shared menu bar. The Motif applications create one Motif menu bar at the top of the main application window. This menu bar is created with all the menu items needed by that application and it is not altered during the execution of the application. The changing menu bar is not necessary in this environment since only one application is using the menu bar.

Since the OpenDoc compound object paradigm allows several OpenDoc objects, also known as software components, to share the same window, the menu bar must also be shared between these objects. Each OpenDoc object must be able to specify its own set of menu items. The OpenDoc shared menu bar must be modified each time the focus is switched to a different OpenDoc part handler.

Another problem regarding OpenDoc menu bars is that they are supposed to produce special "menu effects" that are not standard Xlib user events. Standard Motif menu selections result in callback functions being invoked for the individual menu push button on which the user clicks.

SUMMARY OF THE INVENTION

It is therefore one object of the present invention to provide a data processing system having a graphical user interface.

It is another object of the present invention to provide a data processing system with GUI where multiple software objects share a common menu.

The foregoing objects are achieved as is now described. According to the present invention, a computer system and method of operation are disclosed that manages a menu bar shared by a group of active applications. The computer system typically uses a bus coupled to a central processing unit and further coupled via the bus to a computer system memory. The computer system further includes an X Window menu manager and an X Window menu bar, both of which are located within the computer system memory during operation. The X Window menu manager includes a shared menu library. The X Window menu manager implements simultaneously instantiation of a set of menu widgets from the shared menu library that are associated with a computer program selected from the several active computer programs when the program focus is shifted to one of the active programs. The X Window menu bar, which is controlled by the X Window menu manager and displayable by the computer system, is shared by the plurality of active programs so that only the computer program receiving the application focus has its associated set of menu widgets displayed after the focus shift. The method for providing the shared menu bar is accomplished as follows. Initially, the system establishes a part editor for each active application. Next, the system passes the focus to one of the active applications and then retrieves a copy of a base menu bar from a window state object in the X Window environment. Afterwards, the system selects the appropriate widgets for display on the computer system. Next, the base menu bar is displayed and then the part editor is notified of the selected widgets to be displayed in the shared menu bar. Lastly, the system displays the selected widgets in the base menu bar or X Window menu bar.

In the preferred embodiment, the X Window or base menu bar is a Motif menu bar and the selected widgets are selected from a OpenDoc menu library. Additionally, the Motif menu bar further comprises a Motif widget library.

Further to the preferred embodiment, an OpenDoc system is operated in the X Window environment and includes an OpenDoc menu library that communicates with the part editor for each active application. The menu library further communicates with the Motif widget library, which in turn communicates with an Xt toolkit library. The Xt toolkit library communicates with an Xlib graphics library that provides the screen drawing calculations for the display in the computer system.

Another embodiment of the computer system is one that operates in an X Window graphical user interface environment again with a plurality of active computer programs. A common menu bar that is displayable by the computer system and shared by the plurality of active computer programs is provided. The common menu bar includes a shared X Window menu library having a set of widgets associated with each of the active computer programs and an X Window menu manager connected to the shared menu library that displays in the common menu bar a set of widgets associated with one of the active computer programs. The system focus is shifted to this selected active computer program and the menu manager and menu library provide the appropriate widgets for the common menu bar to represent the widgets accessible to the user in the common menu bar.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
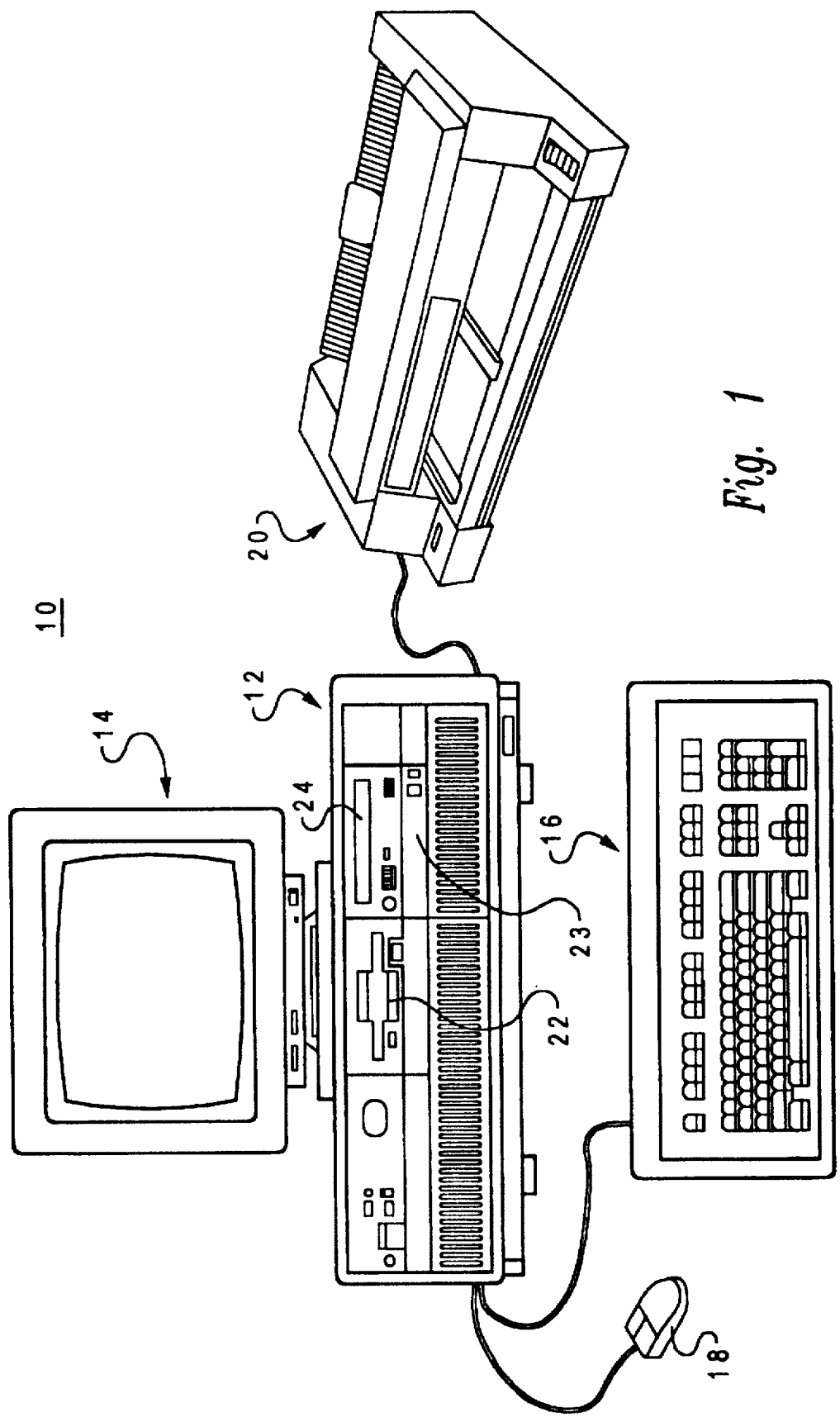
FIG. 1 depicts a preferred embodiment of a data processing system which may be utilized to implement the method of the present invention.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled in the art will recognize that other graphical pointing devices, including a graphics tablet, stylus, light pen, joystick, puck, trackball, trackpad, and the IBM TrackPoint™ can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 2:
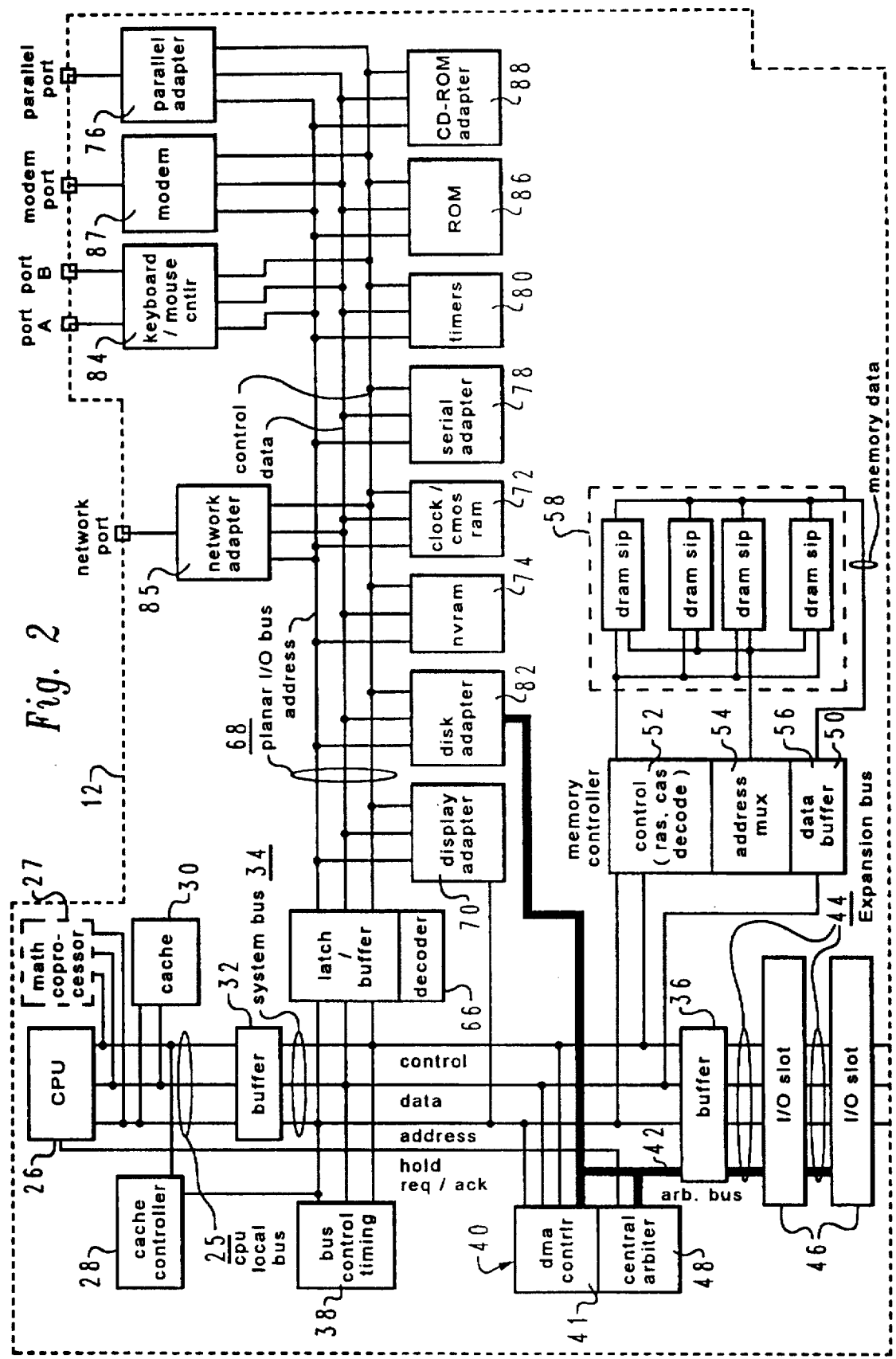
FIG. 2 is a block diagram of the principal components of system unit of data processing system.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 can be implemented as one of the 80X86 microprocessors, which are available from a number of vendors. In addition to CPU 26, an optional math coprocessor 27, cache controller 28, and cache memory 30 are coupled to high-speed CPU local bus 25. Math coprocessor 27 is an optional processor, distinct from CPU 26, that performs mathematic computations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22–24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and expansion bus 44. Connected to expansion bus 44 are a number of I/O slots 46 for receiving adapter cards which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 masters coupled to expansion bus 44. Bus master support allows multiprocessor configurations of expansion bus 44 to be created by the addition of bus master adapters containing a processor and its support chips. System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 24 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 24 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS) which provides user-transparent I/O when CPU 26 is operating under the DOS operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a graphical pointing device such as mouse 18. As will be described in greater detail below, keyboard/mouse controller 84 receives a serial signal from mouse 18 that indicates each incremental displacement of mouse 18.

Finally, system unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN). A LAN provides a user of data processing system 10 with a means of electronically communicating information, including software, with a remote computer or a network logical storage device. Additionally, LAN supports distributed processing, which enables data processing system 10 to share a task with other data processing systems linked to the LAN. Modem 87 supports communication between data processing system 10 and another data processing system over a standard telephone line. For example, modem 87 may be utilized to connect data processing system 10 to an on-line information service, such as the information service provided by Prodigy Services Corporation under the service mark "PRODIGY." Such on-line service providers frequently offer software that can be downloaded into data processing system 10 via modem 87. Furthermore, through modem 87, data processing system 10 can access other sources of software, such as a server, an electronic bulletin board, and the Internet or World Wide Web. Parallel port 76 transmits printer control signals and output data to printer 20 through a parallel port.

As is typical of many data processing systems, following power on, the various hardware components of data processing system 10 will each execute its own internal reset procedures to regain a stable, known state. At the completion of these reset procedures, CPU 26 will execute POST code within ROM 86 to initialize system hardware, setup the BIOS data area, and construct and interrupt vector table, as well as other tasks. Following POST, a "boot strap" or primary operating system loader is run to load segments of an operating system (OS) 100 (see FIG. 3) into RAM 58 and launch execution of OS 100, which in a preferred embodiment of the present invention utilizes AIX, available from IBM Corporation. For an overview of the present invention, the following is given. The operating system provided for the Macintosh family of computers, manufactured by Apple Corporation, includes a menu manager that allows applications to create private menu bars, populate that with menus, and display them in a shared location, typically at the top of the screen. When a user switches from one application to another, the shared menu bar automatically displays the new applications' menus. In contrast, AIX does not provide a menu bar or a common location for menu bar display. Instead, each application window is responsible for creating and displaying its own menu bar, within its own window.

Most AIX applications use the Motif toolkit to implement their menu bars. The Motif toolkit is a well-known standard for use in the AIX body of applications and is well-known to those skilled in the art. It is desirable for OpenDoc menus to share the Motif "look and feel;" however, Motif alone is not adequate for implementing OpenDocs menu APIs. In particular, OpenDoc allows users to create PlatformMenu objects independently of an OpenDocMenuBar object. Under Motif, the Motif menu shell widgets must always be created as a child of an existing menu bar widget and can never be moved to a different menu bar.

Figure 3:
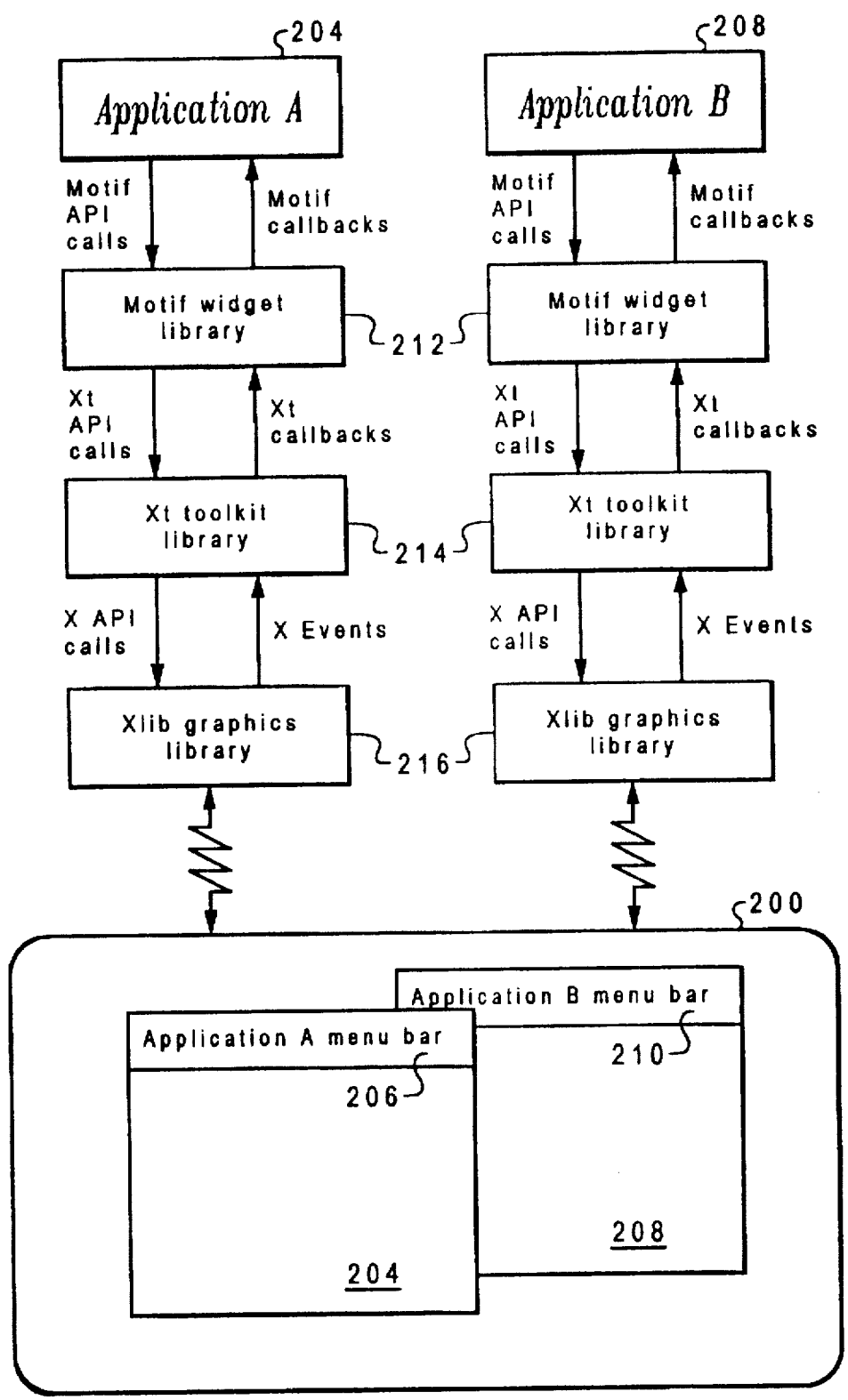
FIG. 3 depicts a GUI, where application A and application B are shown.

An example of such is shown in FIG. 3. In FIG. 3 is shown a GUI 202, where application A and application B are shown. Application A 204 includes a menu bar 206 while application B 208 includes a menu bar 210. Motif API calls and Motif callbacks are exchanged between application A and the Motif widget library 212 which further exchanges API calls and callbacks between XT toolkit library 214. The toolkit library 214 exchanges X API calls and XEvents with the Xlib graphics library 216, which provides screen display in the GUI 202. The same operation occurs for application B 208, which operates independently of the application A 204.

The present invention proposes a special shared AIX OpenDoc menu library to act as a menu manager. The OpenDoc menu library switches the visible menu bar to match the OpenDoc object in focus. An ODPlatformMenu object is defined that handles the creation of individual Motif menu bars. OpenDoc part handlers, former applications converted into OpenDoc objects, never directly create Motif menu widgets. Instead, they pass the necessary information to the ODPlatformMenu and ODMenuBar objects, which then create and manage the Motif widgets as necessary.

This implementation allows for "just in time" instantiation of the Motif widgets. This means that the widgets are not created until right before they are displayed. This contrasts with typical Motif applications that create all the menu widgets at program initialization. The ODPlatformMenu object also takes care of registering "dummy" callbacks for all menu items and converting these into synthetic OpenDoc "menu events."

Figure 4:
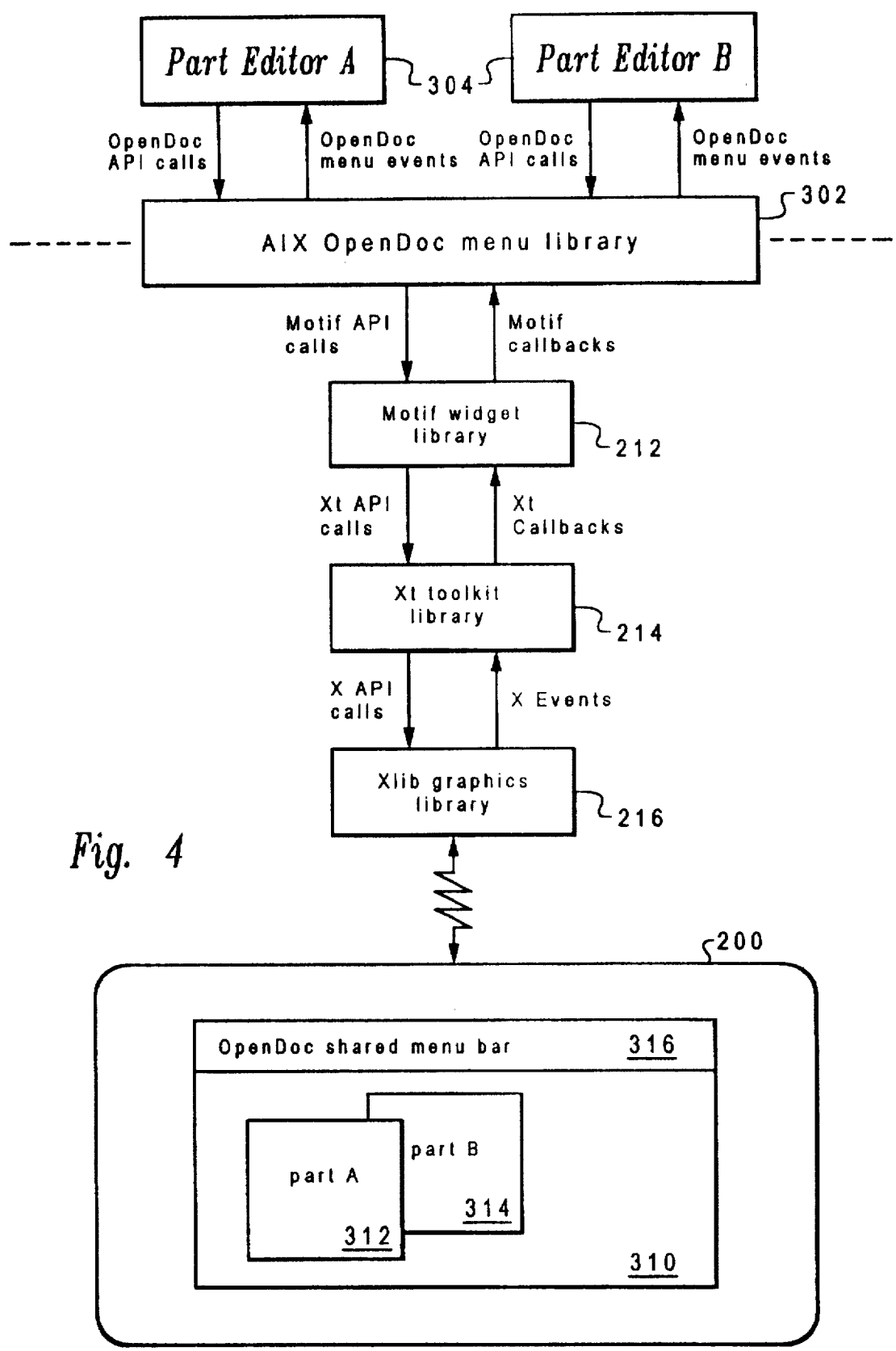
FIG. 4 is a block diagram of the part editor for each application and the AIX OpenDoc menu library according to the present invention.

An example of the AIX OpenDoc menu library is illustrated in FIG. 4, which is a block diagram of the part editor for each application and the AIX OpenDoc menu library 302. A Part editor 304 is provided for each application. Each Part editor 304 passes OpenDoc API calls to OpenDoc menu library 302 and receives OpenDoc menu events from the same.

The OpenDoc menu library 302 then receives Motif callbacks from and sends Motif API calls to Motif widget library 212. Motif widget library 212 receives Xt callbacks from and sends Xt API calls to Xt toolkit library 214. Xt toolkit library 214 also receives XEvents from and sends X API calls to the Xlib graphics library 216. The graphics library 216 sends and receives these calls and events from and to GUI 200. Shown in GUI 200 is a single window 310 where software component A 312 and software component B 314, represented by part A and part B, respectively, are illustrated that both share a common OpenDoc shared or base menu bar 316.

Figure 5:
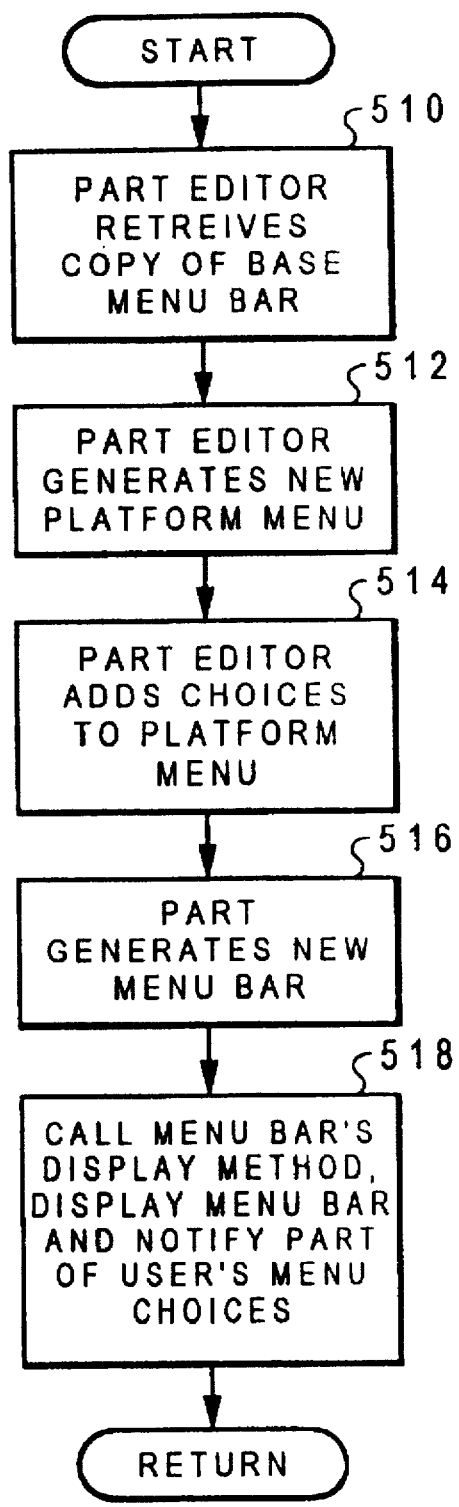
FIG. 5 depicts a flow diagram of the setting up of a shared menu bar on OpenDoc for AIX according to the present invention.

The setting up of a parts menu bar on OpenDoc for AIX is depicted in the flow diagram of FIG. 5. First, in block 510, the part retrieves a copy of the base menu bar from the window state object. Next, in block 512, the part generates a new PlatformMenu using the menu bar's NewMenu( ) method. In block 514, the part adds choices to the platform menu using its AddChoiceLast( ) method. Then, in block 516, the part uses the menu bar's AddMenuBefore( ) method to emplace the new PlatformMenu( ). In block 518, the part then calls the menu bar's Display( ) method. At this point the menu bar is now displayed and the part will be notified of the user's menu choices via the parts HandleEvent( ) method. A code implementation example is shown in the Appendix I, which further includes the private structure as used by PlatformMenu class. The code is given in SOM (C++) under OpenDoc.

Furthermore, changes to menu bar for PlatformMenu class and Motif widget support is also provided as listed in Appendix II. Whenever the DocShell gets a mouse or keyboard event, the DocShell then calls the MenuBar::HandleEvent( ), which then checks to see if the mouse events window belongs to a widget in menu bar's hierarchy, or if the keyboard event matches an accelerator for one of the widgets in menu bar's hierarchy or one of the other menu keys described in the Motif style guide. Further, the third mouse button when activated will cause the active parts menu to pop up, regardless of the window under the pointer.

If the event does not belong to the menu bar, MenuBar::HandleEvent( ) will return false.

If the event does belong to the menu bar, it will be passed to XtDispatchEvent( ), which then passes control to the OSF/Motif menu widget code until the user ends the menu interaction by releasing the button or pressing an appropriate key. If the user selects a menu item, a generic callback then notifies either the DocShell via a special HandleBaseMenuItem( ) method or the active part, via the parts general HandleEvent( ) method.

As described above, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROM 86 or optical disks readable by CD-ROM drive 24); (b) information alterably stored on writable storage media (e.g., floppy disks within diskette drive 22 or hard disk drive 24); or (c) information conveyed to a computer through communication media, such as through a computer or telephone network. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

---

APPENDIX I

---

EXAMPLE:
ODMenuBar *mbar;
PlatformMenu *toast_menu, *jam_menu;
mbar = fWindowState→CopyBaseMenuBar();
toast_menu = mbar→NewMenu(this, kToastMenu, "Toast");
toast_menu→AddChoiceLast(kWheatChoice, "Wheat", "<Alt>w", False)
toast_menu→AddChoiceLast(kRyeChoice, "Rye", "<Alt>r", False)
toast_menu→AddChoiceLast(kSdChoice, "Sourdough", "<Alt>s", False)
jam_menu = mbar→NewMenu(this, kJamMenu, "Jam");
jam_menu→AddChoiceLast(kGrapeChoice, "Grape", "<Alt>g", False);
jam_menu→AddChoiceLast(kBoysenChoice, "Boysenberry", "<Alt>b", False);
mbar→AddMenuLast(kToastMenu, toast_menu, this);
mbar→AddMenuLast(kJamMenu, jam_menu, this);
mbar→Display();
Private structures used by PlatformMenu class:
typedef struct {
    int itemID;
    ODIText label;
    KeyCode  accel_key;
    Modifiers accel_mods;
    Boolean   has_toggle, toggle_state;
    Boolean   is_enabled;
    Boolean   is_from_base_menu;  // should we notify DocShell
                                                      // or the active Part when this
                                                      // item chosen?
} PlatformMenuChoice;
typedef struct {
    int itemID;    // need ID to allow removal . . .
}PlatformMenuSeparator;
typedef struct {
    int type
    union {
        PlatformMenuChoice choice_info;
        PlatformMenuSeparator separator_info;
        PlatformMenu submenu_info;
    };
{ PlatformMenuItem;
class Platform menu {
    int MenuID;
    ODIText label;
    Boolean is_enabled;
    ODMenuBar parent_menubar;
    PlatformMenu parent_menu; // NULL unless this is a submenyu
    < Sequence of MenuItem>item;

APPENDIX I

```
public:
    PlatformMenu
    ~PlatformMenu()
    PlatformMenu Copy(int newMenuID)
    void Disable()
    void Enable()
    void AddChoiceBefore(int choiceID, ODItext label, char *accel,
        int before)
    void AddChoiceLast(int choiceID, ODIText label, char *accel)
    void AddToggleChoiceBefore(int choiceID, ODIText label, char
        *accel, Boolean state, int beforeID)
    void AddToggleChoiceLast(int choiceID, ODIText label, char
        *accel, Boolean state)
    void AddSeparatorBefore(int menuID, int sepID, int beforeID)
    void AddSeparatorLast(int menuID, int sepID)
    void AddSubmenuBefore(int subMenuID, int beforeID)
    void AddSubmenuLast(int subMenuID);
    void RemoveMenuItem(int subMenuId);
    void DisableMenuItem(int itemID)
    void EnableMenuItem(int itemID)
    void SetToggleChoice(int itemID, Boolean state)
}  // end class PlatformMenu
```

APPENDIX II

Changes to ODPMenuBar for PlatformMenu class and Motif widget support:

- The following added ODPMenuBar private variables are required:
    < Sequence of PlatformMenu >  fMenus;
    PlatformMenu                   fPopupMenu;
    ODIText                        fLabel;
    SmMenuBar                      fMenuBarWidget;
    RowColumn                      fPopupMenuWidget;

- The following new ODPMenuBar methods are required:
PlatformMenu NewMenu(int menuID, ODPart *part, ODIText label)
Factory method for creating PlatformMenu
EXCEPTIONS:
menuAlreadyExists-There is already a Platformmenu with given
MenuID and Part in WindowState's fMenuRegistry.
DESCRIPTION:
:Allocates a PlatformMenu and copies information into it. Adds
it to WindowState's fMenuRegistry. The label may be freed by the
caller afterwards.
PlatformMenu SetPopup(PlatformMenu popup_menu)
Set the current popup menu.
EXCEPTIONS:
menuInUse-This PlatformMenu is already a child of another menu
bar or menu.
DESCRIPTION:
Sets this menu bar's fPopupMenu to the new menu. To make the
popup respond to user input, use the menu's Enable() method; to
suppress the popup, use the menu's Disable() method.
- The following changes to existing ODMenuBar methods are
required:
void AddMenuBefore(int menuID, PlatformMenu menu, Part* part,
int beforeID)
void AddMenuLast(int menuID, PlatformMenu menu, Part* part)
NEW EXCEPTIONS:
menuInUse-This PlatformMenu is already the child of another menu
bar or menu.
ADDITIONAL:
Set the PlatformMenu's parent_menubar to point to this menu bar.
If this menu bar's fMenuBarWidget exists, create new widgets for
this menu.
void Copy()
Copy all of this menu bar's variables except for fMenuBarWidget;
set it to NULL in the new menu bar.
void Display()
ADDITIONAL:
If this menu bar's fMenuBarWidget is NULL, re-create it using the
information from the menus in fMenuList. Find out from
WindowState which menu bar is currently displaying its menus; it
is not this menu bar, hide the other menu bar's widgets (using
XtUnmanage() if necessary), then manage this menu bar's widgets.

APPENDIX II -continued

Let WindowState know that this menubar is now on display.
void Purge()
ADDITIONAL:
If this menu bar's fMenuBarWidget or fPopupMenuWidget are not
currently visible, destroy them.
void RemoveMenu(int menuID)
NEW EXCEPTIONS:
menuDoesNotExist-No PlatformMenu with the given ID exists.
menuInappropriate-The PlatformMenu is not a child of this menu
bar. (if it is a submenu of a menu in this menu bar, use that
menu's RemoveMenuItem() method.)
ADDITIONAL:
Set the PlatformMenu's parent_menubar to NULL.
If this menu bar's fMenuBarWidget exists, remove all widgets for
this menu.
AIX PlatformMenu Class methods This class allows Parts to create menus and menu items for use
in the Part's ODMenuBars. The following additional APIs will be
provided:
PlatformMenu
Constructor (for factory method use only).
DESCRIPTION
Constructor for Platformmenu class, Private to PlatformMenu and
ODMenuBar class; Parts should call factory methods
ODMenuBar::NewMenu() or PlatformMenu::Copy() instead.
~PlatformMenu()
Destructor for PlatformMenu class.
DESCRIPTION:
Destructor for PlatformMenu class. If this is a submenu, calls
parent menu's RemoveSubmenu() method; if this is a main menu,
calls parent menu bar's RemoveMenu() method. If there are any
submenus in items list, calls RemoveSubmenu() on them. Removes
this menu from WindowState's fMenuRegistry. Deallocates storage
for this menu and all non-submenus in its menu items list.
PlatformMenu Copy(int newMenuID)
Copy a menu and its items.
EXCEPTIONS:
menuAlreadyExists-There is already a PlatformMenu belonging to
this menu's Part with the given newMenuItemInappropriate-One of
this menu's items is a submenu; these must be removed and copies
separately, so that they can be assigned new menu IDs.
DESCRIPTION: Allocates PlatformMenu and copies info into it from
this menu, including all non-submenu items from items list. Adds
it to WindowState's fMenuRegistry.
void Disable()
void Enable()
Enable/disable a PlatformMenu.
DESCRIPTION: Update this menu's 'is_enabled' flag If this menu
has a parent menu bar, and the parent menu bar has a widget
hierarchy, call XtSetSensitive() or XtSetInsensitive() on the
CascadeButton for this menu.
void AddChoiceBefore(int choiceID, ODItext label, char *accel,
int before)
void AddChoiceLast(int choiceID, ODIText label, char *accel)
void AddToggleChoiceBefore(int choiceID, ODiText label, char
*accel, Boolean state, int beforeID)
void AddToggleChoiceLast(int choiceID, ODiText label, char
*accel, Boolean state, int beforeID)
Create and insert menu choice items.
EXCEPTIONS:
MenuItemAlreadyExists-A PlatformMenuItem with given ID already
exists in this menu's items list.
MenuItemDoesNotExist-No PlatformMenuItem with given beforeID
exists in this menu's items list.
DESCRIPTION: Allocate PlatformMenuChoice structure and copy info
into it. Insert it into this menu's items list. If this menu has
a parent menu bar, and the parent menu bar has a widget
hierarchy, add a widget for this choice. The label and
accelerator may be freed by caller when function returns.
void AddSeparatorBefore(int menuID, int sepID, int beforeID)
void AddSeparatorLast(int menuID, int sepID)
Create and insert separators
EXCEPTIONS:
MenuItemAlreadyExists-PlatformMenuItem with given ID already
exists in this menu's items list.
MenuItemDoesNotExist-No PlatformMenuItem with given beforeID
exists in this menu's items list.

APPENDIX II

DESCRIPTION: Allocate PlatformMenuItemSeparator struct and copy
into it. Insert it into this menu's item list. If this menu has
a parent menu bar, and the parent menu bar has a widget
hierarchy, add a widget for this choice.
void AddSubmenuBefore(int subMenuID, int beforeID)
void AddSubmenuLast(int subMenuID);
Insert already-created menu as submenu.
EXCEPTIONS:
MenuItemAlreadyExists-PlatformMenuItem with given ID already
exists in this menu's items list.
MenuItemDoesNotExist-No PlatformMenuItem with given beforeID
exists in this menu's items list.
MenuItemInappropriate-The menu with given submenuID is already
a child of some other menu or menubar; in order to prevent
infinitie loops, it may not be reused. You should use the menu's
Copy() method to get a duplicate of the menu, and then add the
duplicate as a submenu.
DESCRIPTION: Set this submenu's 'parent_menu' field. Copy this
submenu's 'parent_menubar' field from this menu. Insert this
submenu into menu's items list. If this menu has a parent menu
bar, and the parent menu bar has a widget hierarchy, add
necessary widgets for this submenu.
void RemoveMenuItem(int itemID);
Remove any item from menu.
EXCEPTIONS:
menuChoiceDoesNotExist-No PlatformMenuChoice with given choiceID
exists in this menu's items list.
DESCRIPTION: If this menu has a parent menu bar, and the parent
menu bar has a widget hierarchy, remove all widgets for this
item. Remove this item from this menu's item list. If this item
is not a submenu, allocate all storage associated with it. If
this item is a submenu, set its parent_menu and parent_menubar
to NULL.
void DisableMenuItem(int itemID)
void EnableMenuItem(int itemID)
Enable/disable a single item in PlatformMenu
EXCEPTIONS:
MenuItemDoesNotExist-No PlatformMenuItem with given ID exists in
this menu's items list.
menuItemInappropriate-The PlatformMenuItem with given ID cannot
be enabled or disabled because it is a separator.
DESCRIPTION:
If item is a submenu, call its Enable() or Disable() method. If
item is a PlatformMenuChoice, update item's 'is_enabled' flag.
If this menu has a parent menu bar, and the parent menu bar has
a widget hierarchy, call XtSetSensitive() or XtInsensitive() on
the widget for this item.
void SetToggleChoice(int itemID, Boolean state)
Set toggle state of a choice item
EXCEPTIONS:
MenuItemDoesNotExist-No PlatformMenuItem with given ID exists in
this menu's items list.
MenuItemInappropriate-The PlatformMenuItem with given ID is not
a menu choice with toggle button.
DESCRIPTION: Update "toggle_state" flag of PlatformMenuChoice.
If this menu has a parent menu bar, and the parent menu bar has
a widget hierarchy, call XtSetValues
() on the XmNvalue resource of this item's toggle-button widget.

We claim:

1. A method of providing a menu bar within a graphical user interface having a plurality of components, wherein said menu bar displays an appropriate set of menu bar items corresponded to each of said components currently focused, said method comprising the steps of:

adding a shared menu bar object, wherein said shared menu bar object includes a base menu bar and a plurality of component menu bars, wherein each of said component menu bars is associated with one of said components within said graphical user interface;

in response to a focus-selection of one of said components by a user, sending a copy of said base menu bar from said shared menu bar object to said focus-selected component;

applying component specific items to said copy of base menu bar to form a shared menu bar by said focus-selected component; and displaying said shared menu bar which presents an appropriate set of menu bar items corresponded to said focus-selected component.

2. The method of claim 1 wherein said base menu bar comprises a Motif menu bar.

3. The method of claim 1 wherein said method further includes a step of sending said shared menu bar to said shared menu bar object after said applying step.

4. The method of claim 2 wherein said Motif menu bar is developed via a Motif widget library.

5. The method of claim 1 wherein said applying step further includes a step of passing OpenDoc API calls to an OpenDoc menu library.

6. The method of claim 5 wherein said OpenDoc menu library performs the steps of:

sending Motif API calls to said Motif widget library; and receiving Motif callbacks from a Motif widget library.

7. The method of claim 6 wherein said Motif widget library performs the steps of:

sending Xt API calls to an Xt toolkit library; and receiving Xt callbacks from said Xt toolkit library.

8. The method of claim 7 wherein said Xt toolkit library performs the steps of:

sending X API calls to an Xlib graphics library; and receiving X events from said Xlib graphics library.

9. A computer program product for providing a menu bar within a graphical user interface having a plurality of components, wherein said menu bar displays an appropriate set of menu bar items corresponding to each of said components currently focused, said computer program product comprising:

program code means for adding a shared menu bar object, wherein said shared menu bar object includes a base menu bar and a plurality of component menu bars, wherein each of said component menu bars is associated with one of said components within said graphical user interface;

program code means for sending a copy of said base menu bar from said shared menu bar object to said focus-selected component, in response to a focus-selection of one of said components by a user;

program code means for applying component specific items to said copy of base menu bar to form a shared menu bar by said focus-selected component; and program code means for displaying said shared menu bar which presents an appropriate set of menu bar items corresponded to said focus-selected component.

10. The computer program product of claim 9 wherein said menu bar comprises a Motif menu bar.

11. The computer program product of claim 9 wherein said computer program product further includes a program code means for sending said shared menu bar to said shared menu bar object.

12. The computer program product of claim 10 wherein said Motif menu bar is developed via a Motif widget library.

13. The computer program product of claim 10 wherein said program code means for applying further includes a program code means for passing OpenDoc API calls to an OpenDoc menu library.

14. A computer system capable of providing a menu bar within a graphical user interface having a plurality of components, wherein said menu bar displays an appropriate set of menu bar items corresponded to each of said components currently focused, said computer system comprising:

a shared menu bar object having a base menu bar and a plurality of component menu bars, wherein each of said component menu bars is associated with one of said components within said graphical user interface;

means for sending a copy of said base menu bar from said shared menu bar object to said focus-selected component, in response to a focus-selection of one of said components by a user;

means for applying component specific items to said copy of base menu bar to form a shared menu bar by said focus-selected component; and means for displaying said shared menu bar which presents an appropriate set of menu bar items corresponded to said focus-selected component.

15. The computer system of claim 14 wherein said base menu bar comprises a Motif menu bar.

16. The computer system of claim 14 wherein said method further includes a step of sending said shared menu bar to said shared menu bar object after said applying step.

17. The computer system of claim 15 wherein said Motif menu bar is developed via a Motif widget library.

18. The computer system of claim 14 wherein said applying step further includes a step of passing OpenDoc API calls to an OpenDoc menu library.

19. The computer system of claim 18 wherein said OpenDoc menu library performs the steps of:

sending Motif API calls to said Motif widget library; and receiving Motif callbacks from a Motif widget library.

20. The computer system of claim 19 wherein said Motif widget library performs the steps of:

sending Xt API calls to an Xt toolkit library; and receiving Xt callbacks from said Xt toolkit library.

21. The computer system of claim 20 wherein said Xt toolkit library performs the steps of:

sending X API calls to an Xlib graphics library; and receiving X events from said Xlib graphics library.

* * * * *